US011946304B2

(12) United States Patent
Salice

(10) Patent No.: US 11,946,304 B2
(45) Date of Patent: Apr. 2, 2024

(54) HINGE FOR FURNITURE

(71) Applicant: ARTURO SALICE S.P.A., Novedrate (IT)

(72) Inventor: Sergio Salice, Carimate (IT)

(73) Assignee: ARTURO SALICE S.P.A., Novedrate (IT)

(*) Notice: Subject to any disclaimer, the term of this patent is extended or adjusted under 35 U.S.C. 154(b) by 176 days.

(21) Appl. No.: 17/619,619

(22) PCT Filed: Jun. 10, 2020

(86) PCT No.: PCT/EP2020/066053
§ 371 (c)(1),
(2) Date: Dec. 16, 2021

(87) PCT Pub. No.: WO2020/260018
PCT Pub. Date: Dec. 30, 2020

(65) Prior Publication Data

US 2022/0298839 A1 Sep. 22, 2022

(30) Foreign Application Priority Data

Jun. 26, 2019 (IT) ........................ 102019000010089

(51) Int. Cl.
*E05F 1/12* (2006.01)
*E05D 3/14* (2006.01)
*E05D 11/10* (2006.01)

(52) U.S. Cl.
CPC ............ *E05F 1/1284* (2013.01); *E05D 3/142* (2013.01); *E05D 11/1021* (2013.01);
(Continued)

(58) Field of Classification Search
CPC ....... E05D 3/14; E05D 3/142; E05D 11/1014; E05D 11/1021; E05D 11/1028;
(Continued)

(56) References Cited

U.S. PATENT DOCUMENTS 3,744,086 A * 7/1973 Salice ................. E05D 11/1021 16/302
4,112,543 A * 9/1978 Rock ................... E05D 11/1021 16/307
(Continued)

FOREIGN PATENT DOCUMENTS

DE 77 31 101 U1 4/1978
DE 32 06 706 A1 9/1983
(Continued)

OTHER PUBLICATIONS

International Search Report dated Sep. 4, 2020 received in International Application No. PCT/EP2020/066053.
(Continued)

*Primary Examiner* — Jeffrey O'Brien
(74) *Attorney, Agent, or Firm* — Scully, Scott, Murphy & Presser, P.C.

(57) ABSTRACT

A hinge for furniture or the like, which comprises a hinge arm, a hinge box that can be fixed to a door and connected, so that it can oscillate, to the hinge arm by an articulation system, that comprises a first, inner rocker which is connected, so that it can oscillate, with the hinge arm and with the hinge box by a first and a second articulation axis respectively and a second, outer rocker which is connected, so that it can oscillate, with the hinge arm and with the hinge box by a third and a fourth articulation axis respectively; the hinge further comprises a stressing lever supported so that it can oscillate by the first articulation axis of the first rocker and functionally connected to the first rocker, or supported so that it can oscillate by the third articulation axis of the second rocker and functionally connected to the second rocker.

5 Claims, 6 Drawing Sheets

(52) U.S. Cl.
CPC ..... *E05Y 2201/48* (2013.01); *E05Y 2201/624* (2013.01); *E05Y 2900/20* (2013.01)

(58) Field of Classification Search
CPC .... E05D 11/105; E05F 1/1284; E05F 1/1207; E05F 1/123
See application file for complete search history.

(56) References Cited

U.S. PATENT DOCUMENTS 4,152,811 A * 5/1979 Lautenschlager ... E05D 11/1021 16/294
4,226,001 A * 10/1980 Salice ................. E05D 11/1021 16/296
4,654,930 A * 4/1987 Lautenschlager, Jr ....................... E05D 11/1021 16/72
4,894,884 A * 1/1990 Lautenschlager, Jr. ...................... E05D 11/1021 16/296
5,008,977 A * 4/1991 Lautenschlager ... E05D 11/1021 16/288
5,022,117 A * 6/1991 Lautenschlager ... E05D 11/1021 16/296
5,144,722 A * 9/1992 Salice ................. E05D 11/1021 16/245
5,493,759 A * 2/1996 Salice ................... E05D 7/0407 16/245
6,401,298 B1 * 6/2002 Lenz ................... E05D 11/1021 16/335
6,684,453 B2 * 2/2004 Wang ...................... E05F 5/006 16/49
6,715,183 B1 * 4/2004 Lautenschlager ... E05D 11/1021 16/280
7,003,851 B2 * 2/2006 Salice ..................... E05F 5/006 16/342
7,096,535 B2 * 8/2006 Lin ..................... E05D 11/1021 16/50
7,127,778 B2 * 10/2006 Salice ..................... E05F 5/006 16/354
7,533,445 B2 * 5/2009 Salice ..................... E05D 3/142 16/286
7,730,583 B2 * 6/2010 Salice ..................... E05F 5/006 16/288
7,757,348 B2 * 7/2010 Salice ..................... E05F 5/006 16/286
7,810,212 B2 * 10/2010 Salice ..................... E05F 5/006 16/286
7,874,043 B2 * 1/2011 Salice ....................... E05F 5/02 16/337
7,900,321 B2 * 3/2011 Fitz ........................... E05D 3/16 16/362
7,917,995 B2 * 4/2011 Salice ................. E05D 11/1021 16/337
8,214,973 B2 * 7/2012 Salice ................. E05D 11/1021 16/284
8,464,394 B2 * 6/2013 Salice ..................... E05F 5/006 16/337
8,689,402 B2 * 4/2014 Brunnmayr ............... E05D 3/02 16/296
8,707,520 B2 * 4/2014 Salice ..................... E05F 5/006 16/288
9,057,214 B2 * 6/2015 Salice ................... E05D 7/0009
9,169,681 B2 * 10/2015 Cooper ..................... E05D 3/14
9,416,575 B2 * 8/2016 Peer ........................ E05D 15/00
10,060,169 B2 * 8/2018 Chen ....................... E05D 3/142
10,526,827 B2 * 1/2020 Salice ....................... E05D 3/06
10,808,442 B2 * 10/2020 Salice ....................... E05F 3/20
11,377,891 B2 * 7/2022 Salice ....................... E05D 3/16
2002/0050025 A1 * 5/2002 Salice ................. E05D 11/1021 16/254
2007/0209159 A1 * 9/2007 Salice ..................... E05D 3/142 16/277
2012/0186042 A1 * 7/2012 Salice ..................... E05F 5/006 16/302

FOREIGN PATENT DOCUMENTS

DE 202013100261 U1 * 5/2013 ............ E05D 3/142
EP 0 371 364 A1 6/1990
EP 4050185 A1 * 8/2022

OTHER PUBLICATIONS

Italian Search Report dated Mar. 5, 2020 received in Italian Application No. 201900010089, together with an English-language translation.

* cited by examiner

HINGE FOR FURNITURE

The invention relates to a hinge for doors of furniture or the like, in particular a hinge that is configured to maintain the door in the open position.

In the furniture sector, in order to support the doors of items of furniture in an oscillating manner, use is conventionally made of hinges that comprise a fixed part which can be connected to the body of the item of furniture and a moveable part, constituted by a box, which can be connected to the door, the parts of which are articulated to each other in an oscillating manner by way of an articulation system that comprises two connecting rockers and four articulation axes.

In general the hinges comprise similarly adapted elastic means, for example a V-shaped leaf spring which is loaded to push the arm of the fixed part, or the articulation system, in the direction of closure of the hinge in order to bring the door to the closed position and keep it there.

However, in some cases, for example when inside the item of furniture there are drawers mounted flush with the door, as an alternative or in addition to the action of the elastic means adapted to keep the door in the closed position, it would be desirable to have an elastic action adapted to keep the door in the fully open position, so as to guard against the risk that the drawers, when they are opened, could collide with the door while it is not fully open, thus causing damage thereto.

The aim of the present invention is therefore to provide a hinge for doors of furniture or the like which has elastic means that are configured to bring the door to the fully open position and keep it there.

Within this aim, an object of the present invention is to provide a hinge for doors of furniture or the like that is highly reliable, easily and practically implemented and of low cost.

This aim and this and other objects which will become better apparent hereinafter are achieved by a hinge for furniture or the like, which comprises:

- a hinge arm that is configured to be fixed to a fixed part of the item of furniture;
- a hinge box that is configured to be fixed to a door of the item of furniture and is connected, so that it can oscillate, to said hinge arm by an articulation system in order to be movable between an open position and a closed position of the hinge, the articulation system comprising a first, inner rocker which is connected, so that it can oscillate, with the hinge arm and with the hinge box respectively by a first and a second articulation axis and a second, outer rocker which is connected, so that it can oscillate, with the hinge arm and with the hinge box respectively by a third and a fourth articulation axis; and
- elastic means for opening and/or closing the hinge in said hinge arm;

characterized in that it comprises a stressing lever for stressing said elastic opening and/or closing means, said stressing lever being supported so that it can oscillate by said first articulation axis of the first rocker and functionally connected to said first rocker, or supported so that it can oscillate by said third articulation axis of the second rocker and functionally connected to said second rocker, in order to stress the elastic means at least in a neighborhood of the open position of the hinge.

Further characteristics and advantages of the present invention are further defined in the subsequent claims.

The characteristics and the advantages of the present invention will become better apparent from the following description of a preferred but not limiting embodiment of the hinge for furniture, which is illustrated for the purposes of non-limiting example in the accompanying drawings wherein.

Figure 1:
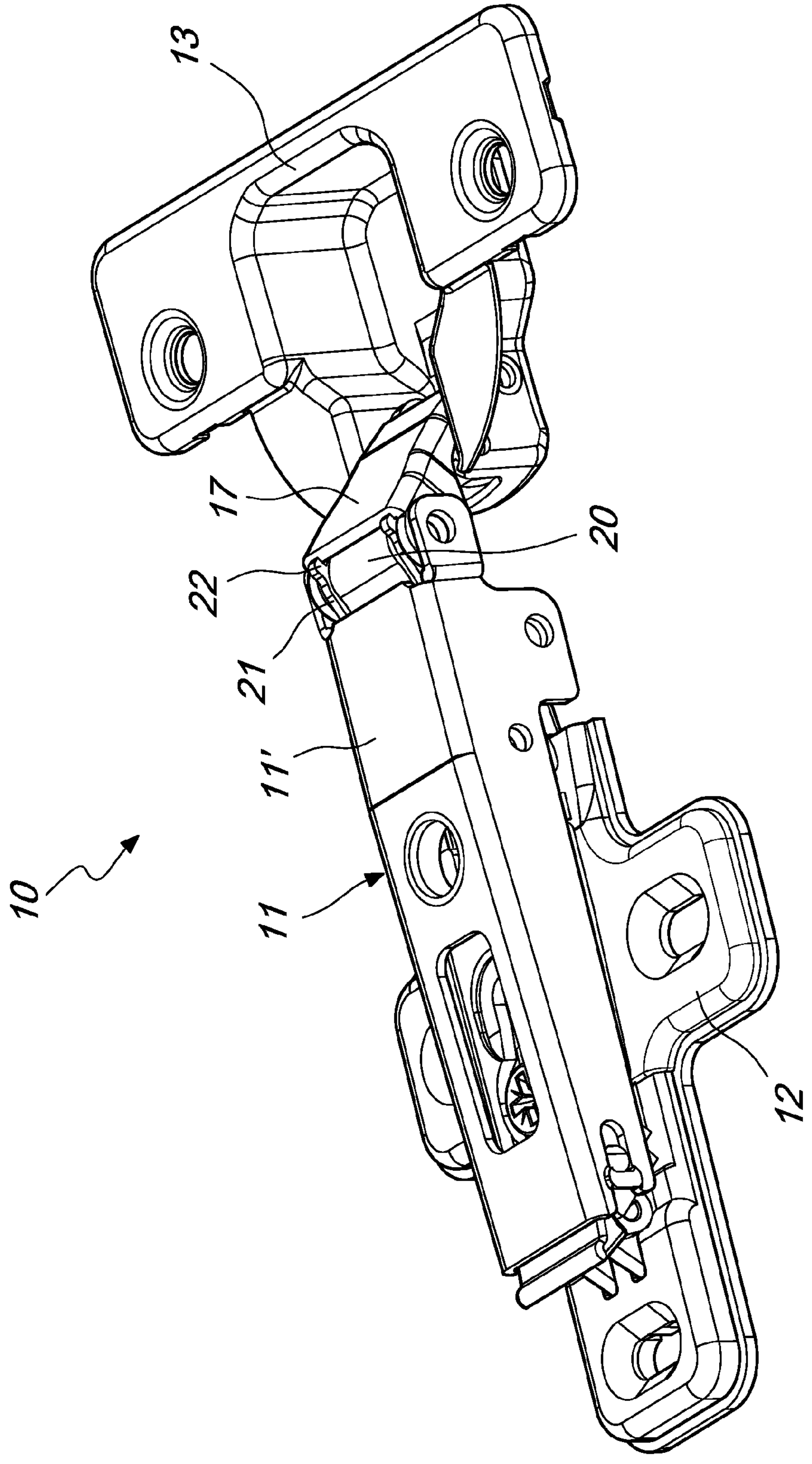
FIG. 1 is a perspective view of the hinge according to an embodiment of the invention.

The hinge according to the present invention, generally designated in the accompanying figures by the reference numeral 10, in general comprises a hinge arm 11 that is configured to be fixed to a fixed part or body of the item of furniture, not shown, for example by way of a fixing base 12 on which the arm 11 can be snap-fastened.

The hinge 10 also comprises a hinge box 13 that is configured to be fixed to a door of the item of furniture and is connected, so that it can oscillate, to the hinge arm 11 by an articulation system in order to be movable between an open position and a closed position of the hinge.

The articulation system comprises a first, inner rocker 14 which is connected, so that it can oscillate, with the hinge arm 11 and with the hinge box 13 respectively by a first 15 and a second 16 articulation axis and a second, outer rocker 17 which is connected, so that it can oscillate, with the hinge arm 11 and with the hinge box 13 respectively by a third 18 and a fourth 19 articulation axis.

The hinge 10 further comprises elastic means 20 for opening and/or closing the hinge, which are arranged in the hinge arm 11 and which, according to the present invention, are configured and stressed in such a way as to exert an elastic action that acts beginning from a certain opening angle, in order to bring the door to the fully open position and keep that door in that position.

If necessary, as a function of the type of application and use of the hinge, such elastic means can also be configured and stressed to exert a further elastic action that acts beginning from a certain opening angle in order to bring the door to the closed position and keep it there.

In order to achieve the foregoing, according to the present invention, the hinge 10 comprises a stressing lever 21 for stressing the elastic opening and/or closing means 20; such stressing lever 21 can be supported so that it can oscillate by the first articulation axis 15 of the first rocker 14 and functionally connected to that first rocker 14 or, more preferably, it can be supported so that it can oscillate by the third articulation axis 18 of the second outer rocker 17 and functionally connected to that second rocker 17 in order to stress the elastic means 20 at least in a neighborhood of the open position of the hinge, so as to achieve the aforementioned elastic action that acts beginning from a certain opening angle in order to bring the door to the fully open position and to keep the door in that position.

Preferably the stressing lever 21 comprises a pressing portion 21' for the elastic means 20, from which two spaced-apart side arms 21" protrude which have coaxial holes 21'" for the articulated connection of the lever 21 to the articulation axis 15 or 18.

For the purposes of the aforementioned functional connection between the stressing lever 21 and the first rocker 14 or the second 17 rocker, the stressing lever 21 and/or the rocker 14, 17 preferably comprise connecting means 22 which are shaped to functionally connect the stressing lever 21 and the corresponding rocker 14, 17 with each other at least in the aforementioned neighborhood of the open position of the hinge.

In the preferred embodiment shown in the figures, in which the stressing lever 21 is supported so that it can oscillate by the third articulation axis 18 of the second outer rocker 17 and is connected to the second rocker 17, such connecting means 22 can for example be in the form of at least one protrusion 22 extending from at least one of the arms 21" of the lever 21 in a direction substantially radial to the holes 21'", so as to come into contact with a thrust surface 17' of the rocker 17, which is arranged substantially radial to the articulation axis 18 and is spaced apart from that axis 18.

The possibility is not ruled out that the connecting means can be of a different type, for example in the form of a geared transmission, or cam means, or a lever mechanism.

Preferably the elastic means 20 are in the form of a leaf spring or a metal wire spring having a first 20' and a second 20" V-shaped elastic arm, which is fixed in the hinge arm 11 by way of one of the articulation axes or by way of another fixing element.

In the embodiment shown, the V-shaped spring 20 is inserted astride and fixed on the third articulation axis 18; in this case the pressing portion 21' of the stressing lever 21 is preferably interposed between a wall 11' of the hinge arm 11 and the first arm 20' of the spring, while the second arm 20" of the spring lies against an abutment element 23 which is connected to the hinge arm 11.

Preferably the abutment element 23 is in the form of a cam which is integral with the first rocker 14 and fixed at the first articulation axis 15 in such a way as to be able to move in an oscillating manner about that axis.

The cam 23 has a resting surface 23' for the second arm 20" of the spring 20; in the embodiment shown, this surface 23' is concentric to the articulation axis 15 so that the second arm 20" of the spring will not be stressed but will simply remain resting on the cam 23; in such case the spring 20 is therefore stressed only by the lever 21.

The possibility is not ruled out however that the resting surface 23' could conveniently be contoured so as to stress the second arm 20" of the spring 20 in order to obtain a further, additional elastic action, for example the aforementioned elastic action that acts beginning from a certain opening angle in order to bring the door to the closed position and keep it there.

Operation of the hinge according to the invention is evident from FIGS. 2 to 5.

Figure 2:
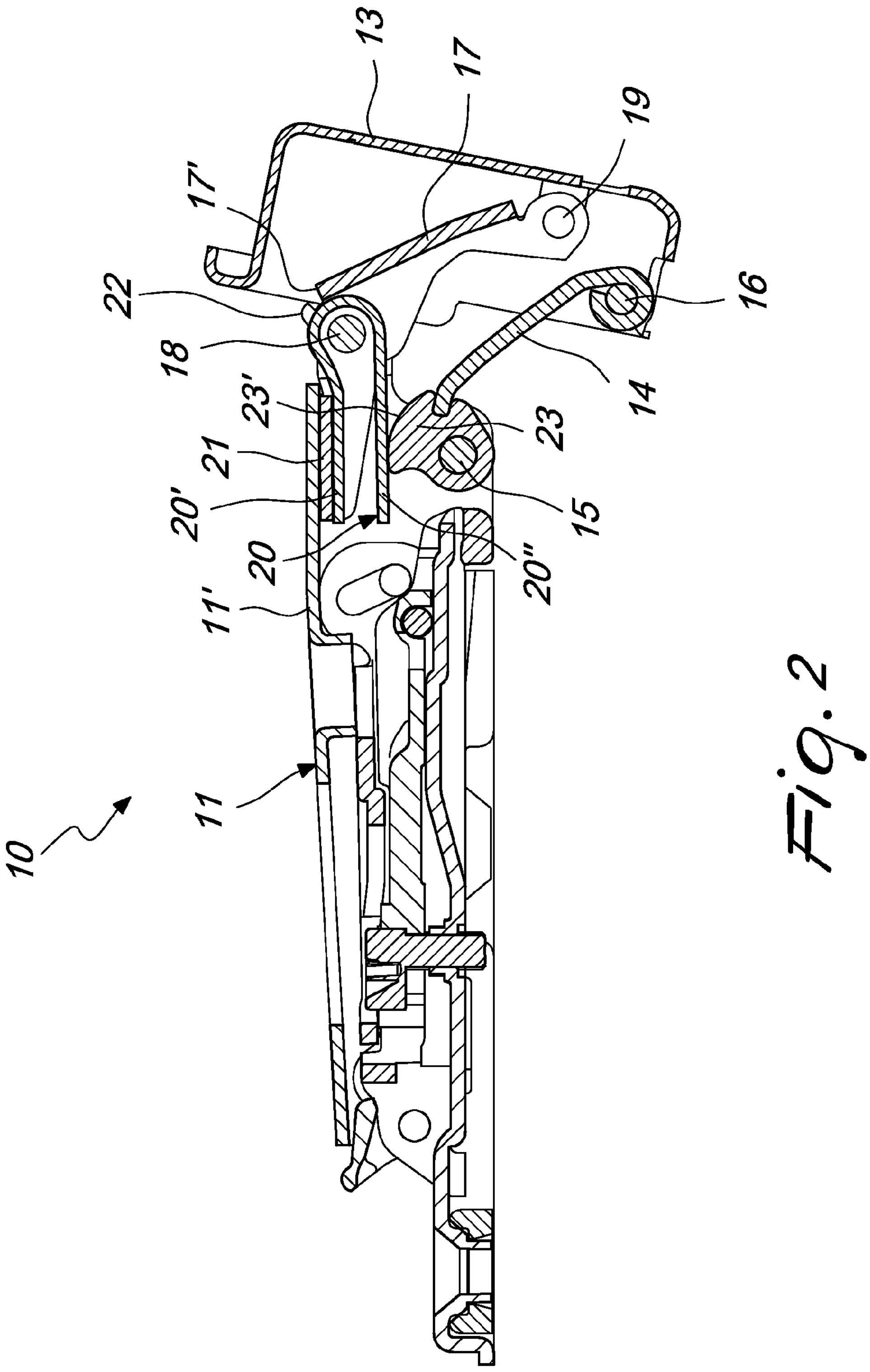
FIG. 2 is a longitudinal cross-sectional view of the hinge of FIG. 1 taken along the line 2-2, where the hinge is in a position proximate to being closed, in which the elastic means are not stressed by the stressing lever.

In particular at the closed position and up to a certain opening angle of the hinge, for example comprised between 30° and 50°, the stressing lever 21 is not functionally connected with the rocker 17 and therefore the spring 20 does not exert any elastic action; this is evident for example from FIG. 2, where the hinge is in an open position comprised in the above mentioned angular range, in which the spring 20 is not stressed and is not capable of exerting any elastic action on the rocker 17 because the protrusion 22 that protrudes from at least one of the arms of the stressing lever 21 is not in contact with the thrust surface 17' of that rocker 17.

Figure 3:
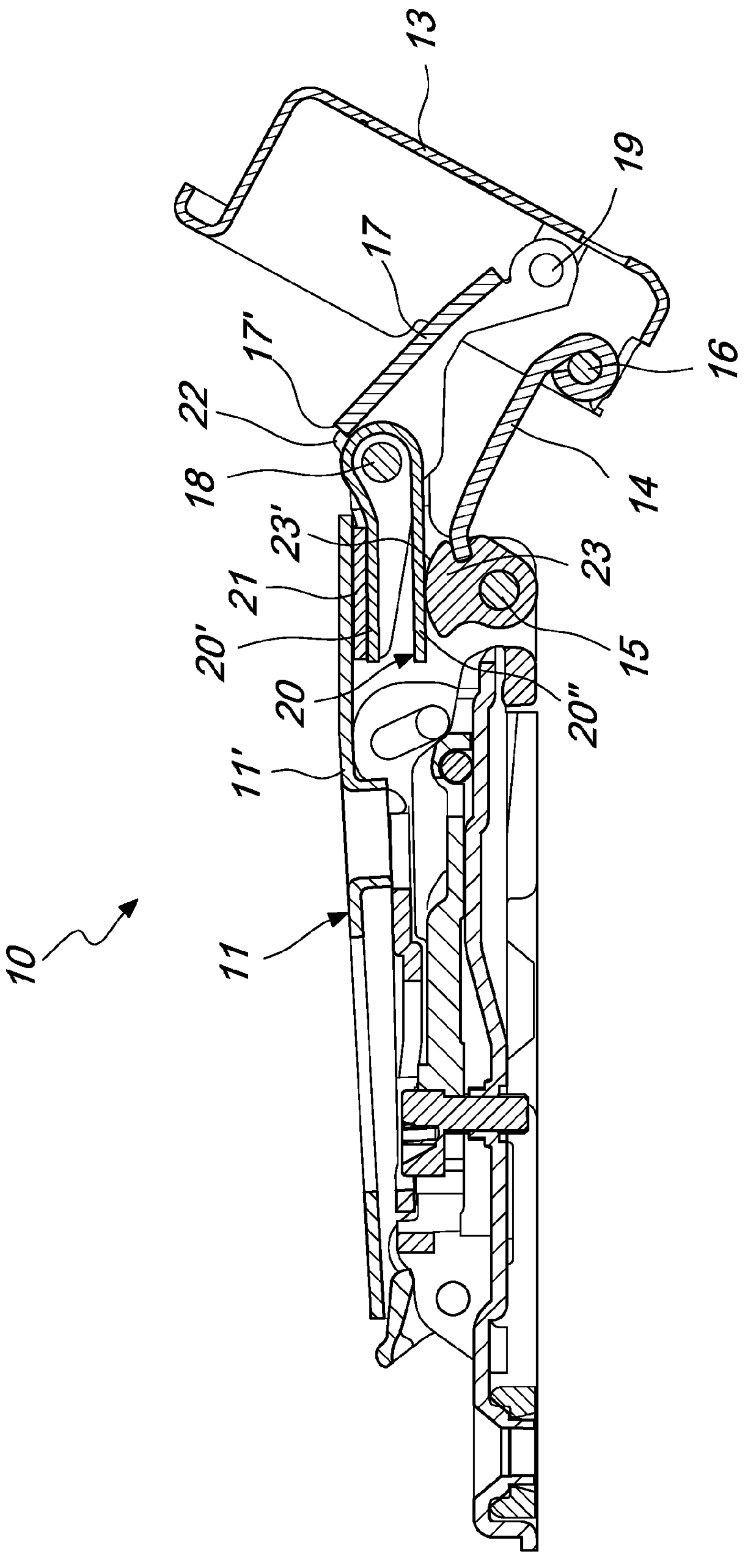
FIG. 3 is a longitudinal cross-sectional view of the hinge of FIG. 1 taken along the line 2-2, where the hinge is in a more open position with respect to the view in FIG. 2, in which the elastic means are beginning to be stressed by the stressing lever.

On continuing to open the door, for example at an opening angle of the hinge comprised between 30° and 50°, as illustrated in FIG. 3, the protrusion 22 of the stressing lever 21 comes into contact with the thrust surface 17' of the rocker 17 and then the spring 20 begins to be stressed by the stressing lever 21.

Figure 4:
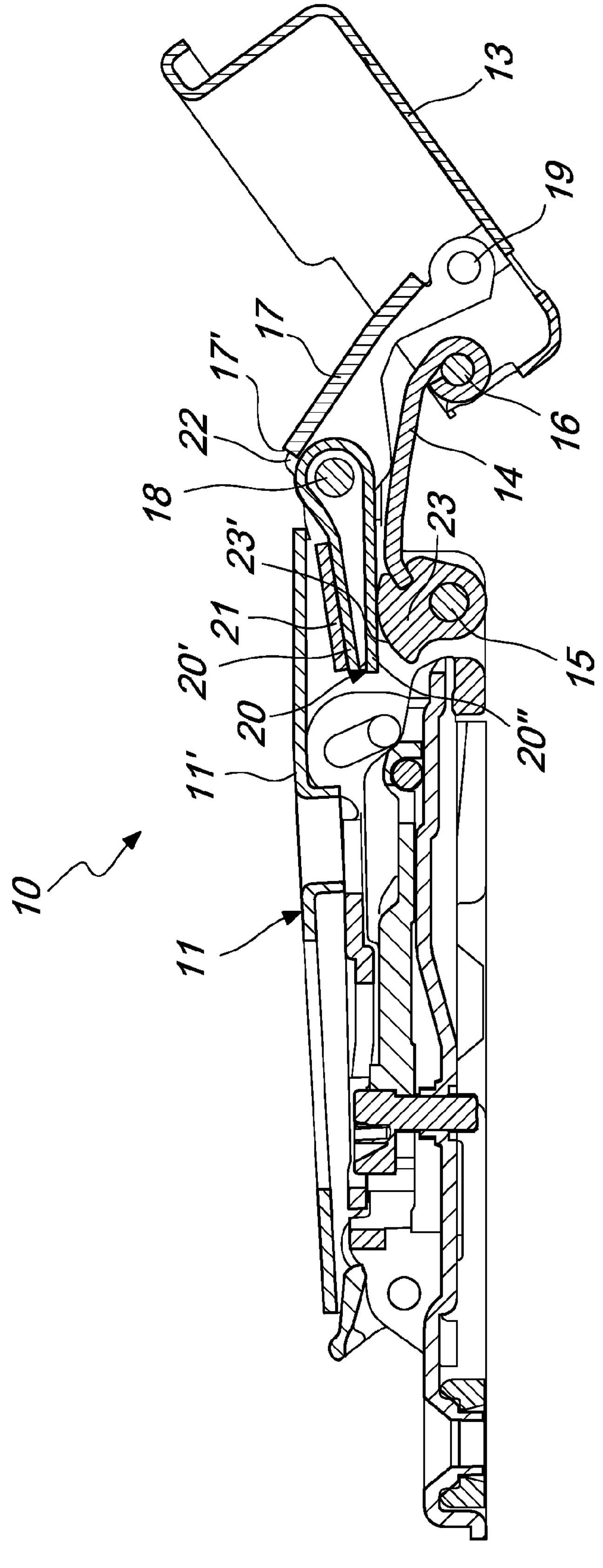
FIG. 4 is a longitudinal cross-sectional view of the hinge of FIG. 1 taken along the line 2-2, where the hinge is in a more open position with respect to the view in FIG. 3, in which the elastic means are in the condition of maximum stress.

Starting from such opening angle, and continuing the movement of opening the door up until an opening angle for example comprised between 50° and 75° is reached, the thrust surface 17' of the rocker 17, acting against the protrusion 22, causes the rotation of the stressing lever 21 which in turn compresses the spring 20 until the latter is brought to the condition of maximum stress shown in FIG. 4.

Starting from this opening angle comprised between 50° and 75°, by virtue of the configuration of the articulation system of an articulated quadrilateral formed by the rockers 14, 17 and by the four articulation axes 15, 16, 18, 19, the rocker 17 inverts its direction of rotation, causing a progressive release of the spring 20 which is such as to generate the aforementioned elastic action that acts in order to bring the door to the fully open position and to keep the door in that position.

Figure 5:
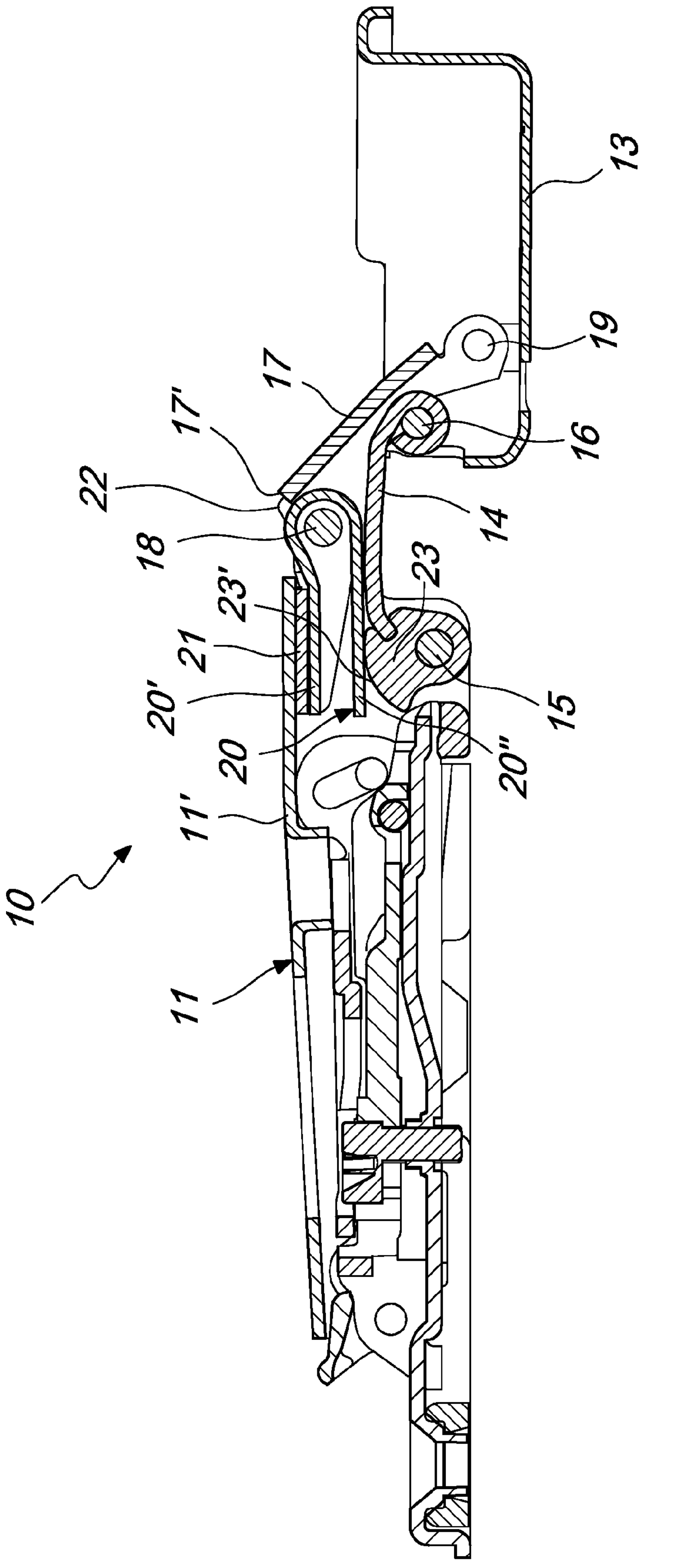
FIG. 5 is a longitudinal cross-sectional view of the hinge of FIG. 1 taken along the line 2-2, where the hinge is in the fully open position, in which the elastic means are at least partially released in order to keep the hinge in such open position.
Figure 6:
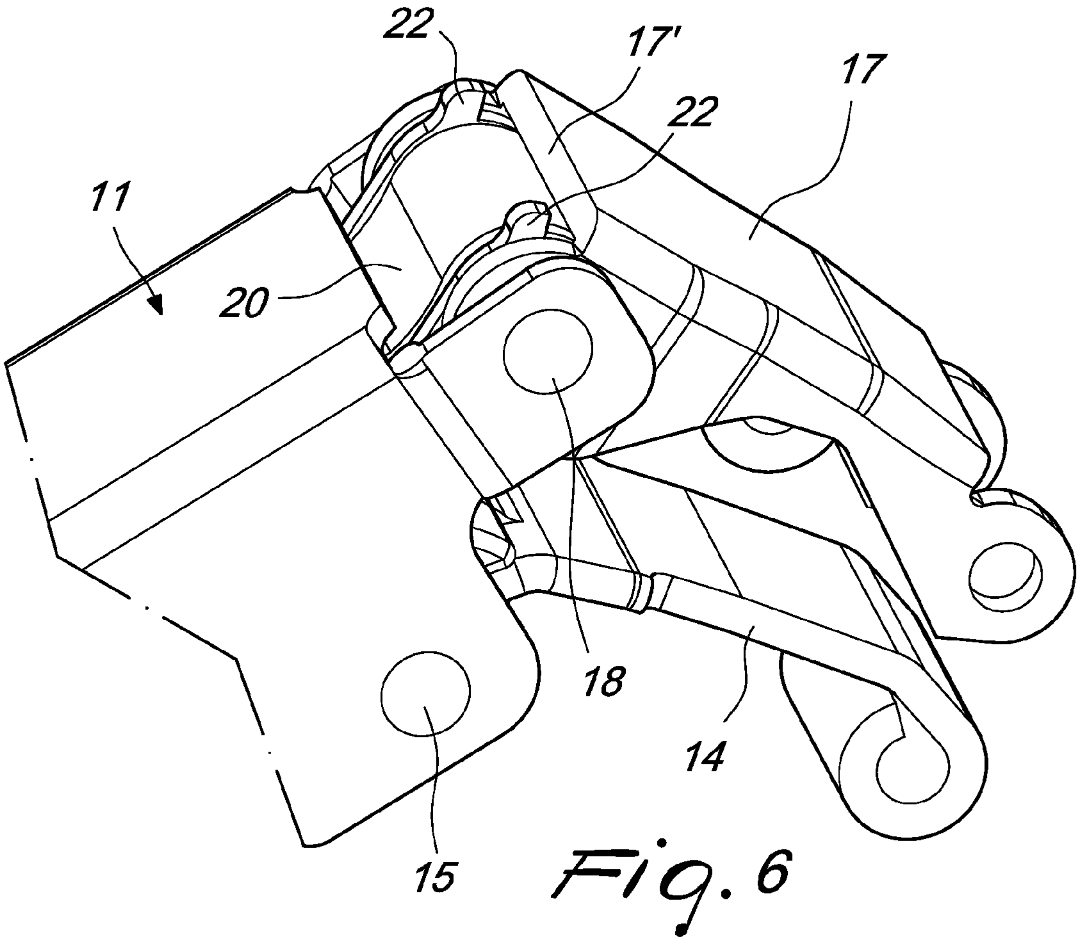
FIG. 6 is an enlarged detail of the hinge in the position proximate to being closed in FIG. 2, with the box removed.
Figure 7:
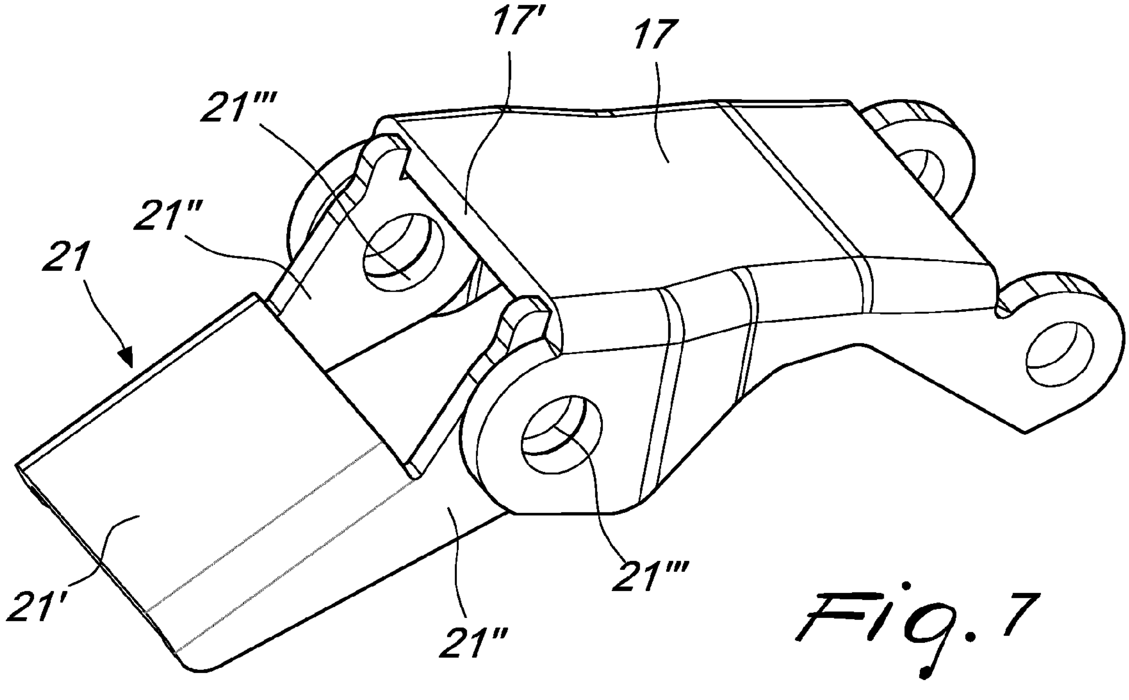
FIG. 7 is a perspective view of the stressing lever and of the rocker which are functionally connected to each other in the fully open position of the hinge of FIG. 5.

Such condition is shown in FIG. 5, where the hinge is in the fully open position, in which the spring 20 has been at least partially released in order to keep that hinge in such open position.

The solution according to the present invention can be applied to hinges of conventional type or even to hinges fitted with devices for the deceleration or damping of the closing and/or opening movement.

Furthermore on each door one or more hinges according to the present invention can be applied, optionally associating them with hinges that have elastic means that are configured and stressed in a different manner, for example hinges fitted with means for closing, so as to enable control of the movement of the door when opening and/or when closing as a function of the requirements and of the type of application in the item of furniture.

From the foregoing it is evident that the hinge according to the invention has elastic means that are configured and stressed so as to effectively exert an elastic action that acts beginning from a certain opening angle in order to bring the door to the fully open position and to keep the door in that position This is achieved in a simple and economic manner by providing for the mounting of the stressing lever according to the invention in a hinge of substantially conventional type.

The hinge according to the invention is susceptible of modifications and variations, all of which are within the scope of the appended claims.

Moreover, all the details of construction may be substituted by technically equivalent elements.

In practice the materials employed, and the contingent shapes, may be any according to requirements and to the state of the art.

The disclosures in Italian Patent Application No. 102019000010089 from which this application claims priority are incorporated herein by reference.

The invention claimed is:

1. A hinge for furniture, which comprises:

a hinge arm that is configured to be fixed to a fixed part of the furniture;

a hinge box that is configured to be fixed to a door of the furniture and is connected, so that it is configured to oscillate, to said hinge arm by an articulation system in order to be movable between an open position and a closed position of the hinge, the articulation system comprising a first, inner rocker which is connected, so that it is configured to oscillate, with the hinge arm and with the hinge box by a first and a second articulation axis respectively and a second, outer rocker which is connected, so that it is configured to oscillate, with the hinge arm and with the hinge box by a third and a fourth articulation axis respectively;

an elastic means for opening and closing the hinge in said hinge arm; and a stressing lever for stressing said elastic means, said stressing lever supported so that it is configured to oscillate by said third articulation axis of the second rocker and functionally connected to said second rocker, in order to stress the elastic means at least in a partially open position of the hinge;

wherein the stressing lever comprises a connecting means which is shaped to functionally connect the stressing lever and the associated rocker with each other at least in said partially open position of the hinge;

wherein the stressing lever comprises a pressing portion for the elastic means, from which two spaced-apart side arms protrude which have coaxial holes for an articulated connection of said lever to said third articulation axis;

wherein said connecting means comprise at least one protrusion extending from at least one of the two spaced-apart side arms of the lever in a direction substantially radial to the coaxial holes, in order to come into contact with a thrust surface of the second rocker, which is arranged substantially radial to the third articulation axis and is spaced apart from said third articulation axis.

2. The hinge according to claim 1, wherein said elastic means is in the form of a V-shaped leaf spring or a V-shaped metal wire spring having a first and a second elastic arm, said elastic means being fixed in the hinge arm by the third articulation axis.

3. The hinge according to claim 2, wherein the elastic means is inserted astride and fixed on the third articulation axis, the pressing portion of the stressing lever being interposed between a wall of the hinge arm and the first elastic arm of the elastic means, the second elastic arm of the elastic means lying against an abutment element which is connected to the hinge arm.

4. The hinge according claim 3, wherein the abutment element is in the form of a cam which is integral with the first rocker and fixed at the first articulation axis in such a way as to be able to move in an oscillating manner about said first articulation axis.

5. The hinge according to claim 4, wherein the cam has a resting surface for the second elastic arm of the elastic means, the resting surface being concentric with respect to the first articulation axis or being a contoured surface.

* * * * *